US008227072B2

(12) United States Patent
Le Bris et al.

(10) Patent No.: US 8,227,072 B2
(45) Date of Patent: Jul. 24, 2012

(54) ARTICLE INCLUDING A SOL-GEL COATING EQUIPPED WITH A FUNCTIONAL DESIGN AND PROCESS FOR PRODUCING SUCH AN ARTICLE

(75) Inventors: Stephanie Le Bris, Chambery (FR); Aurelien Dubanchet, Gresy-sur-Aix (FR); Isabelle Joutang, La Motte Servolex (FR); Jean-Luc Perillon, Saint Paul Trois Chateaux (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 13/190,345

(22) Filed: Jul. 25, 2011

(65) Prior Publication Data

US 2012/0018433 A1    Jan. 26, 2012

(30) Foreign Application Priority Data

Jul. 26, 2010   (FR) ...................................... 10 56092

(51) Int. Cl.
*D21H 21/46*    (2006.01)

(52) U.S. Cl. ..................... 428/199; 428/195.1; 428/201; 428/209; 428/206; 428/210; 427/258; 427/261; 220/573.1

(58) Field of Classification Search ............... 428/195.1, 428/199, 201, 209, 206, 210; 427/258, 261; 220/573.1
See application file for complete search history.

(56) References Cited

U.S. PATENT DOCUMENTS 6,551,693 B1    4/2003    Buffard

FOREIGN PATENT DOCUMENTS

| EP | 2 177 580 | 10/2010 |
|----|-----------|---------|
| FR | 2 915 205 | 10/2008 |
| FR | 2 937 236 | 4/2010 |
| WO | WO 2010/043827 | 4/2010 |

OTHER PUBLICATIONS

French Search Report for French Patent Application No. 10 56092.

*Primary Examiner* — Michael C Miggins
(74) *Attorney, Agent, or Firm* — Loeb & Loeb LLP

(57) ABSTRACT

This invention relates to an article (1) including a substrate (2) including two opposite faces (21, 22), and a sol-gel coating (3) covering at least one of the faces (21, 22) of said substrate (2), in which said sol-gel coating (3) is in the form of a continuous film of a material including a matrix formed by at least one metal polyalkoxylate and at least 5% by weight with respect to the total weight of the coating (3) of at least one metal oxide dispersed in said matrix. According to the invention, the sol-gel coating (3) is coated with a functional design (4) including at least one optically non-transparent chemical substance. This invention also relates to a process for producing an article.

20 Claims, 1 Drawing Sheet

ARTICLE INCLUDING A SOL-GEL COATING EQUIPPED WITH A FUNCTIONAL DESIGN AND PROCESS FOR PRODUCING SUCH AN ARTICLE

FIELD OF THE INVENTION

This invention relates in general to articles with a surface covered with a sol-gel coating equipped with a functional design. This invention also relates to a process for producing such articles.

The articles concerned by the present invention can in particular be cooking articles such as skillets, saucepans, or sauté pans, barbecue grills, flat irons, or hair straightening irons.

The term functional design refers, in this invention, to a design enabling the user of the article to be guided in his or her use.

The term sol-gel coating refers, in this invention, to a coating synthetically produced by sol-gel from a solution based on liquid-phase precursors, which is converted into a solid by a set of chemical reactions (hydrolysis and condensation), at low temperature. The coating thus obtained can be organomineral or entirely mineral.

The term organomineral coating means, in this invention, a coating of which the network is essentially inorganic, but which comprises organic groups, in particular due to the precursors used and the baking temperature of the coating.

The term entirely mineral coating means, in this invention, a coating made up of an entirely inorganic material, free of any organic group. Such a coating can also be obtained by sol-gel with a baking temperature of at least 400° C., or from tetraethoxy-silane (TEOS) precursors with a baking temperature that can be below 400° C.

BACKGROUND OF THE INVENTION

In the field of sol-gel coatings, those obtained from metal alkoxides based on silicon (silanes) or based on aluminum (aluminates) are known in particular.

These coatings are currently being widely developed in the field of cooking articles, and in particular as nonstick coatings covering the internal cooking surface.

These nonstick coatings, which are synthesized by sol-gel from metal polyalkoxylate precursors, have a hybrid network, generally of silica with grafted alkyl groups. By comparison with the traditional nonstick coatings for cooking articles based on polytetrafluoroethylene (PTFE), this type of coating obtained by sol-gel has, as the main advantage, very good performance at temperatures above 300° C.

A formulation of this type of coating is described in the international application WO 2008/010639. It is in particular to a coating formed by sol-gel from a silane-based composition, in which said coating is applied to an anodized aluminum substrate intended to be used as a cooking article.

In addition, the applicant has developed a coating of this type intended for cooking articles. Thus, the international application WO 2008/142327 and European application EP 2 139 964, belonging to the applicant, describe a coating formed by sol-gel from a composition based on at least one metal alkoxide and a colloidal metal oxide, in which a very small amount of silicone oil is added. The coating thus formed is not only resistant to high temperatures, but it is also capable of withstanding several minutes of exposure to the flame of a Bunsen burner (of which the temperature is above 600° C.) and then quickly recover its hydrophobic character.

International patent application WO 2007/104258 and European patent application EP 1 835 002 belonging to the CERASOL HONG KONG LTD company specializing in research and development of ceramic coatings for domestic and industrial applications, describes the formulation and process of production of a nonstick coating having improved abrasion resistance, hardness and durability with respect to a PTFE coating. It involves a two-layer coating consisting of a primer comprised of colloidal silica, organoalkoxysilanes optionally with a polydimethylsiloxane (PDMS), and a transparent finishing layer comprised of organoalkoxysilane colloidal silica including a fluoroalkoxysilane to provide the nonstick property and optionally a PDMS.

Finally, patent application CN 101502378 describes in detail the formulation of a coating for cooking articles making it possible to reduce and even eliminate the oxidation of edible oils. It is a coating formed by sol-gel from a composition based on methyltrimethoxysilane (MTMS) or methyltriethoxysilane (MTES) and a colloidal alumina dispersion, filled with different inorganic fillers including a nano-silver powder enabling the oxidation mechanism of the oils to be stopped.

None of these sol-gel coatings known from the prior art is equipped with a functional indicator, i.e. an indicator enabling the user of the article, on which the coating in question is deposited, to be supported and guided.

BRIEF DESCRIPTION OF THE FIGURES

The invention can be better understood by references to the detailed description when considered in connection with the accompanying Figures.

DETAILED DESCRIPTION OF THE INVENTION

Figure 1:
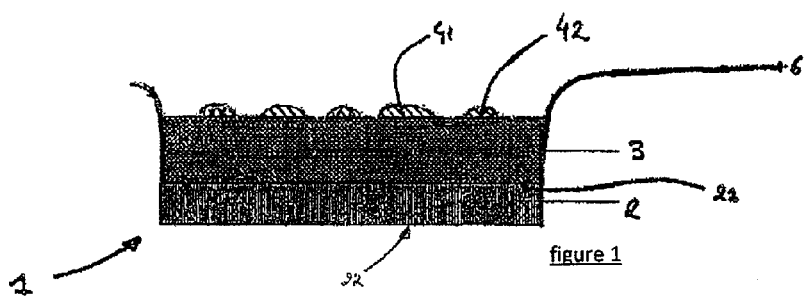
FIG. 1 is a transverse cross-section view of a first example of a cooking container according to the invention equipped with a thermochromic design arranged on the sol-gel coating, without a finishing layer.

While the present disclosure can be embodied in many different forms, the drawings and discussions are presented with the understanding that the present disclosure is an exemplification of the principles of one or more inventions and is not intended to limit any one of the inventions to the embodiments illustrated.

This invention is intended to provide the consumer with an article including a coating synthesized by sol-gel, equipped with a functional design enabling guidance in the use thereof.

More specifically, this invention is intended to provide an article including a substrate having two opposite faces, and a sol-gel coating covering at least one of the faces of said substrate, in which said sol-gel coating is in the form of a continuous film of a sol-gel material including a matrix of at least one metal polyalkoxylate and at least 5% by weight, with respect to the total weight of the coating, of at least one metal oxide dispersed in said matrix.

According to the invention, said sol-gel coating is coated with a functional design including at least one optically non-transparent chemical substance.

In the context of this invention, the functional indicator is a differentiating element, active or passive, having a color and/or brightness different from the sol-gel coating, at least at a given temperature.

In the case of a passive functional indicator, this (or these) difference(s) is (are) thermostable (i.e. not changing when the temperature of the article changes), which can, for example, consist of a graduation, or a mark enabling the user to be visually guided in the positioning of foods at the center of the article (in the case of a cooking article).

In the case of an active functional indicator, this (or these) difference(s) is (are) thermochromic (i.e. changing when the temperature of the article changes), which can therefore indicate, to the user of the article, the temperature reached by the coating during use. Thus, a thermochromic functional indicator is beneficial in the case of a cooking article, in which good control of the temperature during cooking of foods is necessary for sanitary and gustatory reasons (for example, for searing a steak on a grill or in a skillet), and for limiting occasional overheating that can weaken the coating of the cooking article. In the case of a hair iron, a thermochromic functional indicator enables the user to know the optimal temperature of use of the hair iron. Finally, in the case of a flat iron, a thermochromic functional indicator makes it possible to prevent, for example, any risk of burning with the hot base (in particular when the iron reaches its operating temperature and the indicator light of the thermostat turns off).

As examples of optically non-transparent chemical substances that can be used in the design layer according to the invention, thermostable pigments, thermochromic pigments, flakes and mixtures thereof can thus be cited.

A passive functional indicator in the sense of this invention will include only thermostable pigments or flakes as optically non-transparent chemical substances.

By contrast, an active functional indicator in the sense of this invention will necessarily include, as optically non-transparent chemical substances, a thermochromic pigment composition, with at least one thermochromic pigment, which is preferably semi-conducting (SC).

Advantageously, the design is itself coated with a continuous transparent finishing layer, which comprises, as a binder, a sol-gel material including a matrix formed by at least one metal polyalkoxylate and at least 5% by weight, with respect to the total weight of the coating, of at least one colloidal metal oxide dispersed in said matrix in order to ensure perfect visibility of the design.

The transparent finishing layer serves to protect the design from abrasion (while allowing visibility of the underlying design) and confers the nonstick properties on the entire coating (i.e. the sol-gel coating, the design and the finishing layer).

The design can comprise at least two partially superimposed layers.

In addition, the design can comprise at least one non-continuous layer.

Preferably, the design can comprise at least two partially superimposed non-continuous layers.

According to an embodiment of the invention, the internal surface of the substrate is coated, at least partially, with a non-continuous design including a plurality of patterns, which can be broken down into two categories:

patterns that include a thermochromic pigment that darkens as the temperature increases (for example ferric oxide), and patterns that include a thermochromic pigment that lightens as the temperature increases (for example, a pigment mixture consisting of perylene red and a black food-grade pigment such as FA1120 by FERRO).

According to another embodiment of the invention, this thermochromic pigment composition can include:

composite pigment grains with a core-envelope structure, the diameter of which is between 20 nm and 25000 nm, and each of which includes:
a core including a SC pigment that is thermochromic and lipid-sensitive under heat (i.e. capable of being broken down under heat in contact with an oil or a fat), and
a solid envelope, transparent and continuous, that is formed by an inorganic material (preferably a silica shell) or a hybrid organomineral material, and
optionally, at least one thermostable pigment, located inside or outside composite pigment grains, in which the thermostable pigment is as defined above.

As examples of a metal polyalkoxylate that can be used as a binder in the coating as well as in the finishing layer, it is possible to cite in particular, polyalkoxysilanes, aluminates, titanates, zirconates, vanadates, borates and mixtures thereof.

As an example of a colloidal metal oxide that can be used in the coating as well as in the finishing layer, it is possible to cite in particular silica, alumina, cerium oxide, zinc oxide, vanadium oxide and zirconium oxide. The preferred colloidal metal oxides are silica and alumina.

Preferably, the design is free of a thermostable binder. In this case, for certain types of applications, the addition of formulation additives may be necessary in order to adapt the properties of the composition to the application process. Thus, for applications by serigraphy or tampography, the presence of at least one thickener is necessary in the composition of the design layer(s), and said thickener can be organic (urethane, acrylic, cellulose base, etc.) or inorganic (pyrogenic silica, Laponite®, etc.). Other modes of application of the design are possible, in particular by spraying, curtain, roller, quenching, painting, ink jet, and so on. The compatibility of a design without a binder with the adjacent layer(s) (in this case the sol-gel coating layer and, as the case may be, the finishing layer) is perfect: no problem of wettability during application of the surface layer on the design, and no problem of cleavage of the layers after baking. In addition, the composition of a design layer without a binder is easily adaptable to different application process, while remaining stable over time.

However, the design can also comprise at least one binder that is thermostable at least 300° C., compatible with the sol-gel material of the coating, and, as the case may be, that of the finishing layer.

As a thermostable binder that can be used in the design layer, silicone resins or polyester-silicone resins will preferably be used. It is also possible to use sol-gel materials including a matrix formed by at least one metal polyalkoxylate and at least 5% by weight, with respect to the total weight of the coating, of at least one colloidal metal oxide dispersed in said matrix.

It is also possible to envisage different types of articles according to the invention, with different shapes and made of different materials.

Thus, the substrate can be a material chosen from among metals, wood, glass, ceramics and plastic materials.

Preferably, the substrate will be a metal substrate made of anodized or non-anodized aluminum, or polished, brushed or microbeaded, sanded, chemically treated aluminum or polished, brushed or microbeaded stainless steel, or hammered or polished copper.

With regard to the shape, the substrate must have the final shape of the article, because it cannot be deep-drawn after deposition of the sol-gel coating.

In the field of cooking, it is also possible to envisage different substrate shapes, and in particular cooking articles as such, intended or not for cooking foods, with:
- a first of the opposite faces is an internal concave face intended to be arranged on the side of the food that may be placed inside the article, and
- a second of the opposite faces is an external convex face intended to be arranged on the side of a heat source.

As non-limiting examples of cooking articles according to this invention, it is possible to cite in particular cooking articles such as saucepans and skillets, woks and sauté pans, crêpe pans, grills, molds and plates for pastry cooking, and barbecue plates and grills.

It is also possible to envisage other types of substrates that are not limited only to the field of cooking. Thus, it is possible to envisage, as examples of articles according to the invention, household appliances, or components made of plastic for automobiles or drug packaging.

This invention also relates to a process for producing an article according to the invention, including the following series of steps:
- a) providing a formed metal substrate in a form including two opposite faces, then
- b) producing a sol-gel coating on at least one of the faces of said substrate, which includes the following series of steps:
  - b1) preparing a sol-gel SG composition including at least one colloidal metal oxide and at least one metal alkoxide precursor;
  - b2) applying, at least one layer of the sol-gel SG composition having a thickness of at least 5 μm on at least one of the faces of said substrate in full or in part; then
- d) baking the article so as to obtain a sol-gel coating at least 1 μm in thickness;

said process is characterized in that it also comprises, prior to the baking step (d), a step (c) of producing a functional design including the application, on at least partially the sol-gel coating, of at least one layer with a design composition including at least one optically non-transparent chemical substance in order to form a design, in which said design composition has a minimum viscosity of 1.5 Pa·s.

The measurement of the viscosity can be performed by means of a viscosimeter (for example, that sold by the BROOKFIELD company) or a rheometer (for example, that sold by the GEMINI company), at room temperature and for a shear rate of between 1 and 1000 s$^{-1}$.

The baking of the sol-gel coating and finishing layers is therefore performed simultaneously.

The metal alkoxide is as defined above. It is preferably a colloidal metal oxide chosen from colloidal silica and/or colloidal alumina.

Preferably, as a precursor, a metal alkoxide chosen from the following group is used:
- the precursors satisfying the general formula $M_1(OR_1)_n$,
- the precursors satisfying the general formula $M_2(OR_2)_{(n-1)}R_2'$, and
- the precursors satisfying the general formula $M_3(OR_3)_{(n-2)}R_3'_2$, with:
- $R_1$, $R_2$, $R_3$ or $R_3'$ designating an alkyl group,
- $R_2'$ designating an alkyl or phenyl group,
- n being an integer corresponding to the maximum valence of the metals $M_1$, $M_2$ or $M_3$, and
- $M_1$ $M_2$ or $M_3$ designating a metal chosen from Si, Zr, Ti, Sn, Al, Ce, V, Nb, Hf, Mg or Ln, Advantageously, the metal alkoxide of the SG solution is an alkoxysilane.

As examples of alkoxysilanes that can be used in the SG solution of the process of the invention, it is possible to cite in particular methyltrimethoxysilane (MTMS), tetraethoxysilane (TEOS), methyltriethoxysilane (MTES), dimethyldimethoxysilane, and mixtures thereof.

Preferably, the MTES and TEOS alkoxysilanes will be used because they have the advantage of not containing methoxy groups. Indeed, the hydrolysis of the methoxy leads to the formation of methanol in the sol-gel formulation, which, in consideration of its toxic classification, requires additional precautions during application. By contrast, the hydrolysis of the ethoxy groups produces only ethanol having a more favorable classification and therefore less restrictive usage prescriptions for the sol-gel coating.

Advantageously, the process according to the invention can also include, between step (c) of producing the function design and the baking (d) of the article, a step (c') of applying, on said design, a continuous transparent finishing layer, including:
- the preparation of a transparent sol-gel SG' composition including at least one colloidal metal alkoxide and at least one metal oxide precursor; then
- the application, on the design and the parts of the sol-gel coating that may not be covered by the design, of at least one layer of the sol-gel SG' composition having a thickness of at least 1 μm in the wet state.

Advantageously, the design can be free of a thermostable binder and comprise, as a thickener, an anionic polyelectrolyte in an amount of 2% to 20% by weight with respect to the total weight of the design.

The invention is presented in greater detail in the following examples. In the examples, unless otherwise indicated, all of the percentages and parts are expressed in terms of weight. Advantageously, the design is free of a thermostable binder and comprises, as the thickener, an anionic polyelectrolyte in an amount of 2% and 20% by weight with respect to the total weight of the design.

EXAMPLES

Functional Design Layer
  Thermostable pigments:
  titanium dioxide (white color) (grade RN56 of Kronos),
  polysulfide sodium aluminosilicate, ultramarine blue color (grade CM13 of Holliday Pigments),
  any other pigment resistant to a temperature greater than or equal to 200° C.;
  Thermochromic pigments:
  ferric oxide $Fe_2O_3$ sold by the Bayer company under the name Bayferrox,
  perylene red, combined with a thermostable black food-grade pigment (FA1220 of Ferro);
  Flakes: Iriodin 100 flakes of Merck;
  Thickener: methacrylic acid and acrylic ester copolymer;
  Solvent: propylene glycol.
Base and Finishing Coating Layers
  colloidal silica in the form of an aqueous solution with 30% silica, sold by the Clariant company under the trade name Klebosol,
  isopropanol, black food-grade pigments sold by the FERRO company under the trade name FA1220, sol-gel polymerization precursor: methyltriethoxysilane MTES, organic acid: acetic acid.

Example 1

Production of Examples of Cooking Articles According to the Invention

A cooking container according to the invention is produced as described below, in reference to the appended figures provided as non-limiting examples:

The same elements shown in FIGS. 1 to 5 are identified by the same numeric references.

FIGS. 1 to 5 show, by way of example, a cooking article according to the invention, a frying pan 1 comprising a metal substrate 2 in the form of a hollow shell equipped with a gripping handle 6, in which the substrate 2 has an internal surface 21 intended to be heated and to receive food to be cooked, and an external surface 2 intended to be arranged on a heat source.

In a first alternative embodiment of a cooking article according to the invention shown in FIG. 1, the internal surface 21, which has previously been at least de-greased and de-dusted, is covered with a coating 3 of the sol-gel type. Typically, it can comprise black food-grade pigments such as FA1220.

To promote adhesion of the sol-gel coating 3 on the internal surface 21 of the substrate 2, it is pre-treated (for example by sanding) so as to increase its specific surface.

Figure 3:
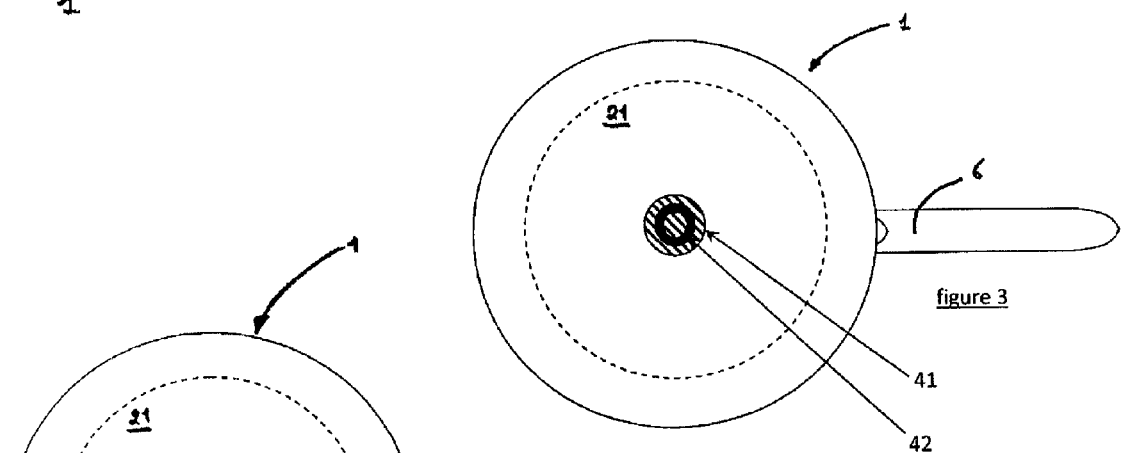
FIG. 3 is a top view of examples of containers according to the invention shown in FIGS. 1 and 2.

The sol-gel coating 3 is covered at least partially by a non-continuous design 4 including a plurality of patterns 41, 42, which are distributed into two categories as shown in FIG. 3:

patterns 41 that include ferric oxide $Fe_2O_3$, which is a thermochromic pigment that darkens as the temperature rises, and patterns 42 that include a thermochromic pigment mixture that lightens with the temperature, consisting of perylene red and FA1220.

The design 4 with its two categories of different patterns 41, 42 is applied by tampography, according to the embodiment of the design layer described in example 2.

Figure 2:
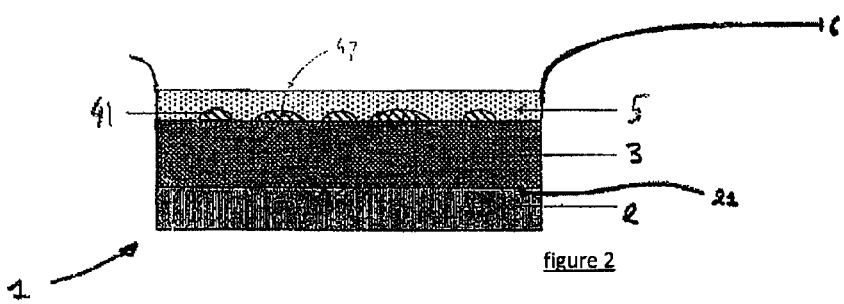
FIG. 2 is a transverse cross-section view of a second example of a cooking container according to the invention equipped with a thermochromic design arranged on the sol-gel coating, itself coated with a finishing layer.

The second alternative embodiment of a cooking article according to the invention, which is shown in FIG. 2 (as well as FIG. 3 for the distribution of patterns), differs from the first alternative (shown in FIG. 1) in that a transparent finishing layer 5 is applied on the design 4 and the sol-gel coating portions 3 that are not covered by the patterns 41, 42 of the design 4, according to the embodiment described in example 4.

Nonstick Performance

For the coating shown in FIG. 1: acceptable because it is easy to remove a cooked egg from the coating by means of a spatula.

For the coating shown in FIG. 2: clearly improved with respect to those obtained with the coating shown in FIG. 1 because a cooked egg on such a coating slides with a simple movement of the article.

Wear Resistance

For the coating shown in FIG. 1: acceptable because the coating can be subjected to 500 abrasive buff passages without any damage to the design (wear resistance).

For the coating shown in FIG. 2: clearly improved with respect to those obtained with the coating shown in FIG. 1 because the coating can be subjected to 5000 abrasive buff passages without any damage to the design.

Figure 4:
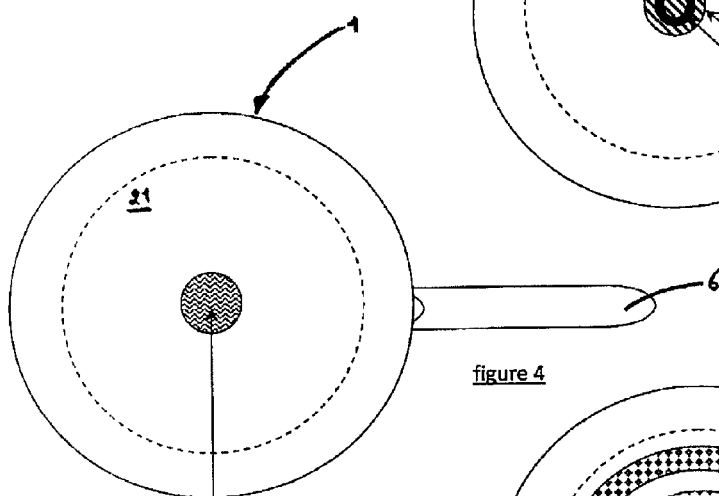
FIG. 4 is a top view of a third example of a cooking container according to the invention equipped with a thermo-stable design in the form of a round dot arranged at the center of the internal surface of the container.
Figure 5:
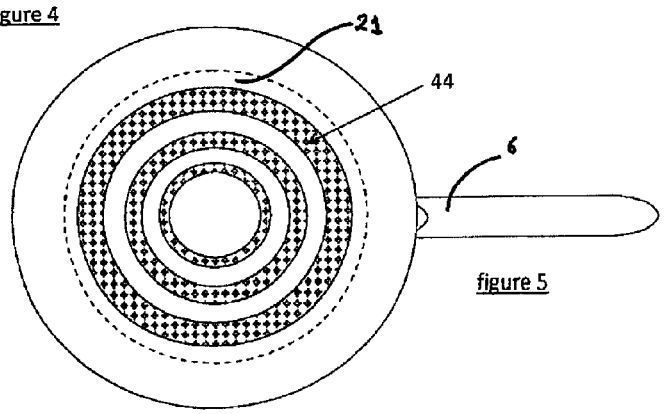
FIG. 5 is a top view of a fourth example of a cooking container according to the invention equipped with a thermo-stable design in the form of concentric circles.

In a third alternative embodiment of the cooking article according to the invention shown in FIG. 4, the design 4 consists of a central spot 43 arranged at the center of the article 1. This spot 43 includes a thermostable pigment, for example titanium dioxide for a white color (grade RN56 of Kronos) or a polysulfide sodium aluminosilicate of ultramarine blue color (grade CM13 of Holliday Pigments). Such a pattern 43 can make it possible to identify a cooking article (color code by type of use: for example, blue color pattern 43 for a specific fish cooking use, red color pattern for a specific meat cooking use, green color pattern for a specific vegetable cooking use, and so on).

In a fourth alternative embodiment of a cooking article according to the invention shown in FIG. 45, the design 4 consists of concentric circles 44 including flakes (for example, Iriodin 100 of Merck). Such a pattern 44 makes it possible to help the consumer to properly position the foods to be cooked in the article.

Example 2

Production of a Design Layer 4

Two pigment pastes are first prepared as follows:

the first pigment paste is obtained by dispersing 50 g of ferric oxide $Fe_2O_3$, in 100 g of water, while the second pigment paste is obtained by dispersing 35 g of perylene red and 15 g of FA1220 in 100 g of water.

The composition (or formula) of each of the patterns 41, 42 differs only by the nature of the pigments used, and therefore the pigment paste used. Each composition therefore includes a pigment paste, diluted with water and a mixture of heavier solvents such as propylene glycol in order to control the drying of the formula. Therefore, two dispersions are obtained, which are then each thickened sufficiently by means of an anionic polyelectrolyte (methacrylic acid and acrylic ester copolymer) in order to have a rheology suitable for application by tampography.

The two thickened compositions thus obtained (one based on the first pigment paste and the other based on the second pigment paste) are applied, in the form of contiguous patterns in at least one layer:

either directly on the internal surface 21 of the substrate 2, according to the first alternative of a cooking article according to the invention shown in FIG. 1, or on the sol-gel coating 3, according to the second and third alternatives of a cooking article according to the invention shown in FIG. 1, In the case of a multi-layer application of these thickened compositions, each layer is dried before the next is applied.

These two thickened compositions are applied in contiguous areas in order to improve the readability of the color-change area (i.e. it is easier for the reader to understand the indication provided by the thermochromic patterns 41, 42).

Example 3

Production of the Sol-Gel Coating Layer 3

A sol-gel composition is prepared in the form of a bi-component including a part A and a part B:

part A includes a dispersion of colloidal silica, water to enable hydrolysis of the metal precursors of part B, isopropanol to enable good accounting for parts A and B and black food-grade pigments, part B comprises, as the sol-gel precursor, methyltriethoxysilane, which enables the formation of the matrix of the coating while rejecting only the ethanol (which is a non-toxic volatile organic compound (VOC), unlike methyltrimethoxysilane, which leads to the formation of methanol, a toxic VOC), as well as acetic acid, enabling the sol-gel reaction to be catalyzed.

These two parts A and B can be preserved for more than 6 months in this separated form.

Then, parts A and B are combined in a mixer in order to create an intimate mixture and enable the hydrolysis reaction to be initiated. It is then necessary to allow the mixture to mature for 24 hours before the actual application, so as to allow the hydrolysis and condensation reactions to progress sufficiently. The pot-life of the mixture is at least 72 hours.

Then, the mixture is filtered on a stainless steel grill having orifices with a diameter of 40 microns, before being applied, with a pneumatic gun, in at least one layer with a thickness of 5 to 50 microns:

either directly and integrally on the internal surface 21 of the substrate 2 according to the second and third embodiments (shown respectively in FIGS. 2 and 3), or on the design 4 and the internal surface portions 21 of the substrate 2, which are not covered by the patterns 41, 42 of the design 4, according to the first embodiment shown in FIG. 1.

In the case of a multi-layer application, each layer is dried before the next is applied.

A coating layer 3 is obtained, which is then subjected to baking at 250° C. for 15 minutes.

Example 4

Production of the Finishing Layer 5

A finishing layer 5 is produced in the same way as the sol-gel coating layer 3, with the only difference being that it must remain transparent.

The formulation of parts A' and B' (corresponding respectively to parts A and B of example 3), the procedure and application are identical to those described in example 3.

The methyl groups of the matrix of the coating based on methyltriethoxysilane OK confer nonstick properties on said layer 5. These properties can be improved by the addition of silicone oil in the finishing layer 5, as described in the European patent application EP 2 139 964.

Once all of the layers have been applied and have dried, the article 1 is baked at 250° C. for 15 minutes. The baking of the sol-gel coating 3 and that of the finishing layer 5 must be performed simultaneously.

Of course, the invention is not limited to the examples described above (primarily cooking articles) and it is possible to envisage other types of heating articles (for example flat irons, barbecue grill plates, and so on) without going beyond the scope of the invention.

While various embodiments of the present invention have been described above, it should be understood that such disclosures have been presented by way of example only, and are not limiting. Thus, the breadth and scope of the present invention should not be limited by any of the above-described exemplary embodiments, but should be defined only in accordance with the following claims and their equivalents.

Having now fully described the invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference in their entirety.

The invention claimed is:

1. An article of manufacture comprising:
   a substrate having two opposite faces; and
   a sol-gel coating covering at least one of the two opposite faces of said substrate, wherein said sol-gel coating is in the form of a continuous film of a material including a matrix formed by at least one metal polyalkoxylate and at least 5% by weight with respect to the total weight of the sol-gel coating of at least one metal oxide dispersed in said matrix, and wherein said sol-gel coating is coated with a functional design having at least one optically non-transparent chemical substance.

2. The article of manufacture according to claim 1, wherein the functional design is covered with a continuous transparent finishing layer comprising:
   a binder comprising aسol-gel material including a matrix formed by at least one metal polyalkoxylate and at least 5% by weight with respect to the total weight of the sol-gel material of at least one colloidal metal oxide dispersed in said matrix.

3. The article of manufacture according to claim 1, wherein the design comprises at least two partially superimposed layers of the at least one optically non-transparent chemical substance.

4. The article of manufacture according to claim 1, wherein the functional design comprises at least one non-continuous layer.

5. The article of manufacture according to claim 1, wherein the function design comprises at least two partially superimposed non-continuous layers.

6. The article of manufacture according to claim 1, wherein the functional design is free of a thermostable binder.

7. The article of manufacture according to claim 1, wherein the article is a cooking article, wherein one of the two opposite faces is an internal concave face located on the side of the article to be in contact with food and wherein the other of the two opposite faces is an external convex face located on the side of the article to be in contact with a heat source.

8. The article of manufacture according to claim 1, wherein the substrate is made of a material selected from the group consisting of metals, wood, glass, ceramics and plastic materials.

9. The article of manufacture according to claim 1, wherein the substrate is a metal substrate made of a material selected from the group consisting of anodized aluminum, non-anodized aluminum, polished aluminum, brushed aluminum, microbeaded aluminum, sanded aluminum, chemically treated aluminum, polished stainless steel, brushed stainless steel, microbeaded stainless steel, hammered copper and polished copper.

10. The article of manufacture according to claim 1, wherein the functional design comprises at least one binder that is thermostable at a temperature of at least 300° C., which is compatible with the sol-gel material of the sol-gel coating and the finishing layer (5).

11. The article of manufacture according to claim 10, wherein the binder comprises a silicone resin or a silicone-polyester resin.

12. The article of manufacture according to claim 1, wherein the optically non-transparent chemical substance is selected from the group consisting of thermostable pigments, thermochromic pigments, flakes and mixtures thereof.

13. The article of manufacture according to claim 12, wherein the optically non-transparent chemical substance, comprises a thermochromic pigment composition having at least one thermochromic pigment.

14. The article of manufacture according to claim 13, wherein the at least one thermochromic pigment is a semiconducting thermochromic pigment.

15. The article of manufacture according to claim 14, wherein the thermochromic pigment composition comprises composite pigment grains having a core-envelope structure, wherein the diameter of composite pigment grains is between 20 nm and 25000 nm, and each of the grains include
- a core including at least one semiconducting pigment that is thermochromic and lipid-sensitive under heat, and
- a transparent and continuous solid envelope of an inorganic material or a hybrid organomineral material.

16. The article of manufacture according to claim 15, wherein the thermochromic pigment composition further comprising at least one thermostable pigment, located inside or outside the composite pigment grains.

17. The article of manufacture according to claim 15, wherein the envelope of the composite pigment grains is a silica shell.

18. A process for producing an article of manufacture comprising the steps of:
- a) providing a formed metal substrate having two opposite faces;
- b) producing a sol-gel coating on at least one of the two opposite faces of said substrate, wherein the sol-gel coating is prepared by a process comprising the steps of:
  - b1) preparing a sol-gel composition including at least one colloidal metal oxide and at least one metal alkoxide precursor; and
  - b2) applying at least one layer of the sol-gel composition having a thickness of at least 5 μm on all or part of at least one of the two opposite faces of the substrate; and
- c) producing a functional design by applying a functional design composition having a viscosity of at least about 1.5 pascals/second and including at least one optically non-transparent chemical substance to the sol-gel coating to form the functional design; and
- d) baking the article to obtain a sol-gel coating having a thickness of at least 1 μm.

19. The process according to claim 18, further comprising, between steps (c) and (d); the step of applying a continuous transparent finishing layer to the functional design, wherein the finishing layer is at least one layer of a transparent sol-gel composition including at least one colloidal metal alkoxide and at least one metal oxide precursor; wherein the transparent sol-gel composition is applied to the functional design and any part of the sol-gel coating that is not covered by the functional design and wherein the at least one layer of the sol-gel composition has a thickness of at least 1 μm in a wet state.

20. The process according to claim 18, wherein the functional design is free of a thermostable binder and comprises an anionic polyelectrolyte as a thickener in an amount of between 2% and 20% by weight with respect to the total weight of the function design.

* * * * *